June 15, 1926.  J. G. LEONARD  1,588,757
FRICTION METAL
Filed Jan. 15, 1926
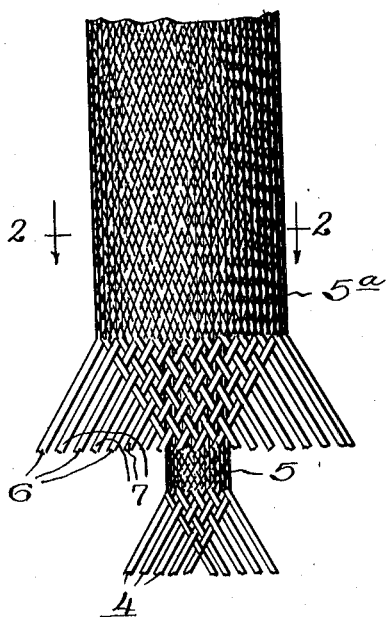

Patented June 15, 1926.

1,588,757

UNITED STATES PATENT OFFICE.

JOHN G. LEONARD, OF MAYWOOD, ILLINOIS.

FRICTION METAL.

Application filed January 15, 1926. Serial No. 81,603.

My present invention relates to the provision of a friction metal, that is to say, the provision of a material suitable for the lining of brake bands and for use in friction boxes and like situations, which will have the necessary physical characteristics for controlling or securing a smooth and uniform development of such a degree of friction as may be desired in a particular case. As is well known the conformation of one to another of surfaces between relatively moving parts has an important bearing upon the amount or degree of friction developed between them, and it is also well known that the metals have different friction producing characteristics which render each of them peculiarly suitable for use in different situations. As will be hereafter seen I have produced a metallic product which is flexible, and therefore easily applied, which is compactable in the direction of its cross-section and therefore conformable to the surfaces with which it is to be associated, and which, by the proper selection and proportioning of the metals of which it is composed, can be produced to satisfy a wide range of friction developing requirements. In fact my product may be advantageously employed in any situation where a flexible, readily compacted metal may be required.

I accomplish the foregoing object by means of the composition and structure hereinafter described and illustrated in the accompanying drawing, in which—

Fig. 1 is a side elevation of a short length of material embodying my invention, the ribbons of which it is composed being shown as incompletely braided so as to illustrate the manner of construction.

Fig. 2 is a section on line 2—2 of Fig. 1; and

Fig. 3 is a cross section of the structure shown in Fig. 1 after the same has been moulded and compressed into a form suitable for brake linings, etc.

Similar reference characters refer to similar features throughout the several views.

My friction metal is provided by braiding together a sufficient number of ribbons, 4, of metal foil to produce a mass of the desired thickness for the particular use for which it is required. At the present time tin, lead, copper, aluminum and other foils are produced and readily obtainable upon the market. Each one of these metals has different friction producing characteristics. I prefer to employ the foil in ribbons by approximately two inches in breadth and braid them into a cord or rope of desired thickness for the service for which the product is intended.

For lining brake bands and for use in friction boxes I obtain a product which is lasting and by means of which a uniformly increased application of power produces a uniformly accelerated development of friction by braiding a core, 5, of lead foil, and inclosing this core 5 I braid an exterior casing 5ª of desired thickness of an equal number of alternately disposed ribbons of copper foil, 6, and aluminum foil, 7. It is obvious that the exterior casing may be formed of foil of a single metal or that foils of a number of different metals may be taken in other than equal proportions so as to secure a wide range of friction developing characteristics.

Heat is a necessary concomitant of the development of friction and in deciding upon the kinds and proportions of foil to be employed for a certain service the heat developed, the heat conductivity of the respective metals, their other reactions to the degree of heat developed and their respective toughnesses should all receive due consideration.

After a cord or rope of the desired thickness has been produced it is moulded by either running through suitable forming rollers or by compression in suitable dies. A cross-section of the material after it has been moulded in a form suitable for brake linings is shown in Fig. 3.

The flexibility and cross-sectional compressibility, or plasticity, of my friction metal makes it readily applicable to surfaces of any conformation, and these features, especially the latter, permits of the securing of a high degree of conformation and contact between the moving surfaces where the friction is developed. It will be further appreciated that through the practice of my invention herein described, including the proper selection and proportioning of the metal foils, not only can the development of friction be rendered more uniform, but that its development may be decreased as well as increased in situations where that may be desirable.

Having described my invention, what I claim as new and desire to secure by Letters Patent is:

1. A friction material comprising a core of a relatively soft metal surrounded by an exterior casing of a plurality of different metals, the metals of said core and exterior casing consisting of ribbons of foil braided together.

2. A friction material consisting of a lead core and a copper and aluminum exterior casing, the said respective metals being in the form of ribbons of foil, the said core and exterior casing having their respective metal foils braided together.

JOHN G. LEONARD.